(12) United States Patent
Kato

(10) Patent No.: US 8,351,131 B2
(45) Date of Patent: Jan. 8, 2013

(54) LENS APPARATUS

(75) Inventor: Takashi Kato, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/192,046

(22) Filed: Jul. 27, 2011

(65) Prior Publication Data

US 2012/0026605 A1     Feb. 2, 2012

(30) Foreign Application Priority Data

Jul. 27, 2010   (JP) ................. 2010-168196

(51) Int. Cl.
*G02B 15/14* (2006.01)
*G03B 17/00* (2006.01)

(52) U.S. Cl. ........................ 359/698; 359/697; 396/76

(58) Field of Classification Search .......... 359/694–704, 359/811–830; 396/76, 86, 87
See application file for complete search history.

(56) References Cited

U.S. PATENT DOCUMENTS 6,466,378 B2 * 10/2002 Kaneko et al. ............... 359/697

FOREIGN PATENT DOCUMENTS

JP         3278667 B2    5/1997
JP         2009-77090 A  4/2009

* cited by examiner

*Primary Examiner* — Mohammed Hasan
(74) *Attorney, Agent, or Firm* — Rossi, Kimms & McDowell LLP

(57) ABSTRACT

A lens apparatus is switchable between first and second modes. A control master determination unit a lens apparatus as one of a master and a slave when the lens apparatus is operated in the second mode. A command value transmit-receive unit transmits/receives a command value of a target of the lens apparatus to/from another lens apparatus in the second mode, wherein the lens apparatus drives the target according to a command value from a controller for the lens apparatus for the target for which the lens apparatus is the master, and drives the target according to a command value received through the command value transmit-receive unit for the target for which the lens apparatus is set as the slave.

10 Claims, 11 Drawing Sheets

| CONTROLLER | ZOOM | FOCUS |
|---|---|---|
| CONTROLLER ID | A | B |

| ADDRESS | |
|---|---|
| 100 | ZOOM CONTROLLER INFORMATION (COMMUNICATION MASTER)<br>0: NONE, 1: ANALOG, 2: DIGITAL |
| 102 | ZOOM CONTROLLER INFORMATION (COMMUNICATION SLAVE)<br>0: NONE, 1: ANALOG, 2: DIGITAL |
| 104 | FOCUS CONTROLLER INFORMATION (COMMUNICATION MASTER)<br>0: NONE, 1: ANALOG, 2: DIGITAL |
| 106 | FOCUS CONTROLLER INFORMATION (COMMUNICATION SLAVE)<br>0: NONE, 1: ANALOG, 2: DIGITAL |

LENS APPARATUS

BACKGROUND OF THE INVENTION

1. Field of the Invention

The present invention relates to a lens apparatus, in particular, a lens apparatus to be used for a stereoscopic camera which uses multiple lens apparatuses and camera apparatuses to take a parallax image in an image-taking system for stereoscopic camera.

2. Description of the Related Art

A stereoscopic image taking system which uses multiple image-pickup apparatuses, each being usable alone, to perform stereoscopic image taking is conventionally known. Two image-pickup apparatuses used for the stereoscopic image taking as described above are required to be driven simultaneously so that optical conditions of the two image-pickup apparatuses, which change depending on a state (position) of a target to be controlled such as a focus, a zoom and a stop, are always identical with each other.

For example, Japanese Patent No. 3,278,667 discloses a technology for synchronizing two lenses with each other by controlling a position signal of one of the lenses functioning as a master as a position command signal for the other lens corresponding to a slave-side lens. Moreover, Japanese Patent Application Laid-Open No. 2009-77090 discloses a camera, including a connector for connecting another camera, and a technology for performing control to perform stereoscopic image taking when the two cameras are connected to each other.

According to the related art disclosed in Japanese Patent No. 3,278,667, however, it is necessary to provide a circuit for synchronizing an operation of the slave lens with an operation of the master lens in each of the lens apparatuses or the controller. Moreover, according to the related art disclosed in Japanese Patent Application Laid-Open No. 2009-77090, a dedicated connector for connection of cameras is required to be provided to connect the two cameras to each other.

Therefore, the image-pickup apparatuses, each being usable alone, and the controller cannot be directly used for the stereoscopic image taking. Specifically, the circuit for synchronization control or the connection member is disadvantageously required to be additionally provided.

SUMMARY OF THE INVENTION

In view of the problem described above, the present invention has an object to provide a lens-driving system which directly uses conventional zoom lenses and a conventional controller, each being usable alone, to enable stereoscopic image taking without requiring the addition of a circuit for stereoscopic image taking when the stereoscopic image taking is performed.

In order to achieve the above-mentioned object, the present invention provides a lens apparatus to be used switchably between a first mode in which the lens apparatus is used as an independent lens apparatus, and a second mode in which the lens apparatus is used in synchronization with another lens apparatus, the lens apparatus including: a control master determination unit for determining the lens apparatus as one of a master and a slave for each target to be controlled of the lens apparatus when the lens apparatus is operated in the second mode; and a command value transmit-receive unit for transmitting and receiving a command value of the target to be controlled of the lens apparatus to and from the another lens apparatus when the lens apparatus is operated in the second mode, in which the lens apparatus drives the target to be controlled according to a command value from a controller for the lens apparatus for the target to be controlled for which the lens apparatus is set as the master, and drives the target to be controlled according to a command value received through the command value transmit-receive unit for the target to be controlled for which the lens apparatus is set as the slave.

According to the present invention, the lens apparatus which directly uses the conventional zoom lenses and the conventional controller, each being usable alone, to enable stereoscopic image taking without requiring the addition of the circuit for stereoscopic image taking when the stereoscopic image taking is performed can be provided.

Further features of the present invention will become apparent from the following description of exemplary embodiments with reference to the attached drawings.

DESCRIPTION OF THE EMBODIMENTS

First Embodiment

Figure 1:
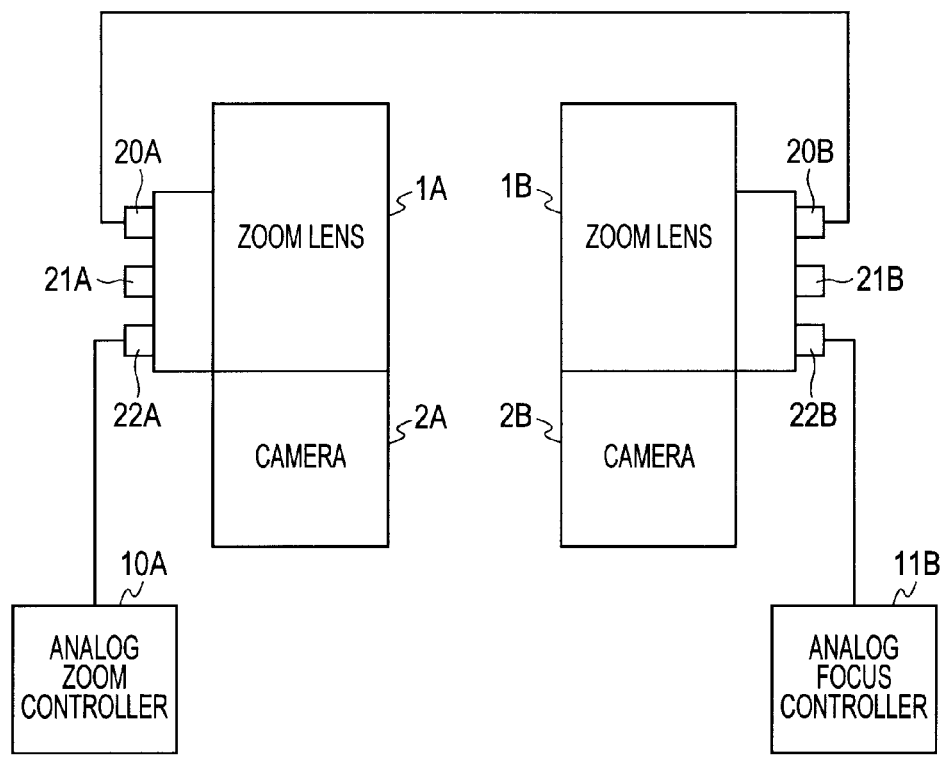
FIG. 1 is a configuration diagram (connection diagram) of a lens apparatus according to a first embodiment.

Hereinafter, a process performed by a lens apparatus according to a first embodiment of the present invention is described referring to the drawings.

Description of Overall Configuration Diagram

FIG. 1 illustrates a configuration of a lens apparatus for performing stereoscopic image taking according to the first embodiment. A zoom lens 1A and a camera 2A are a zoom lens and a camera functioning for the left eye, whereas a zoom lens 1B and a camera 2B are those functioning for the right eye. An analog zoom controller 10A is an operation member for performing a zoom operation and outputs a voltage proportional to the amount of operation of the operation member as a speed command signal. An analog focus controller 11B is an operation member for performing a focus operation and outputs a voltage corresponding to the position at which the operation member is operated as a position command signal. The camera 2A transmits the position command signal for operating an iris to the zoom lens 1A in the form of an analog voltage or a communication command, whereas the camera 2B transmits the position command signal to the zoom lens 1B in the same manner.

The zoom lenses 1A and 1B are connected to each other by the connection between connectors 20A and 20B. As a result, bidirectional communication between the zoom lenses 1A and 1B is enabled.

Description of Functional Blocks of Lens

Figure 2:
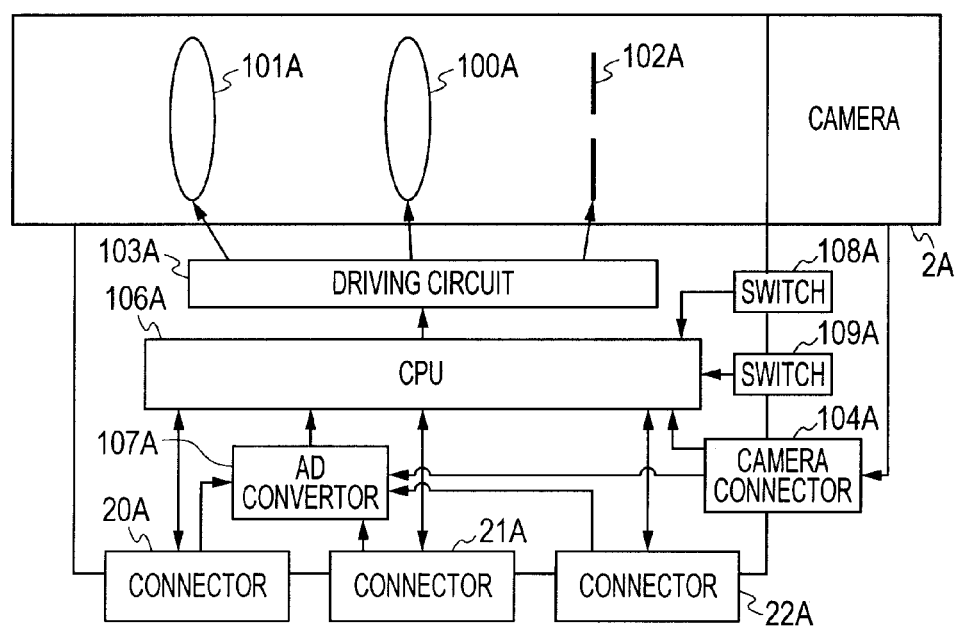
FIG. 2 is a functional block diagram of the lens apparatus.

FIG. 2 illustrates an internal configuration of the zoom lens 1A. The zoom lens 1B has a similar configuration. In FIG. 2, the connectors 20A, 21A and 22A are for connecting the zoom controller 10A and the focus controller 11B and have the same specifications. An input line for an analog command voltage from the analog controllers (not shown) and a transmission/reception line for digital data communication from a digital controller (not shown) are independently provided to each of the connectors 20A, 21A and 22A. The controller, which is connected to the connectors 20A, 21A and 22A and operates the zoom lens 1A, uses the connectors having the same specifications regardless of whether the controller is digital or analog, and selectively uses the digital line and the analog line according to the type of controller, that is, whether the controller is digital or analog, to use the selected line to transmit and receive a signal to/from a CPU 106A of the zoom lens 1A. A camera connector 104A is a connector for connection to a camera and is provided with an input line for an analog command voltage for controlling an iris 102A, which is output from the camera 2A.

A zoom command voltage and a focus command voltage respectively input from the zoom controller and the focus controller, and the command voltage for the iris 102A, which is input from the camera 2A, are transmitted to an AD converter 107A to be converted into digital data and then transmitted to the CPU 106A. The CPU 106A generates a control signal for controlling a zoom 100A and a focus 101A. The control signal is transmitted from the CPU 106A to a driving circuit 103A to control the driving of the zoom 100A, the focus 101A and the iris 102A. A switch 108A is a mode switchover switch for starting control for synchronization with another lens (hereinafter, referred to also as "synchronization control"). A master setting switch 109A is a switch for setting a master for the synchronization control. The mode switchover switch 108A and the master setting switch 109A are connected to the CPU 106A. A state of each of the switches 108A and 109A is read by the CPU 106A. When the master and a slave are set, a slave-side apparatus (lens apparatus) performs control on a target to be controlled based on a command value output (generated) from a master-side apparatus (lens apparatus).

Flowchart of Lens Connection and Mode Switchover

Hereinafter, a process for transition to a synchronization control mode for the synchronization control of the two zoom lenses is described. In contrast to a state (first mode) in which each of the zoom lenses according to the present invention is used alone, a state in which the multiple zoom lenses are controlled in synchronization with each other is defined as a synchronization control mode (second mode). When the zoom lenses are not operated in the synchronization control mode, each of the zoom lenses functions as a conventional zoom lens which can be used alone.

Figure 3A:
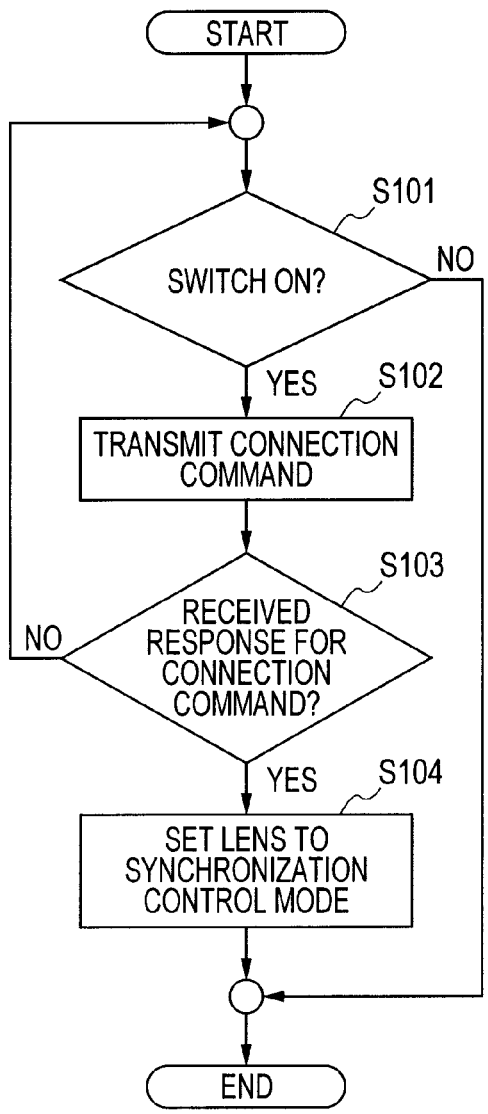
FIG. 3A is a flowchart illustrating a process for transition to a synchronization mode.

FIG. 3A is a flowchart of a process for transition to the synchronization control mode, which is performed in the zoom lens 1A. In Step S101, the state of the mode switchover switch 108A is checked. When the mode switchover switch 108A is in an ON state, the process proceeds to Step S102 where a connection command is transmitted. The connection command is transmitted to the zoom lens 1B through the connector 20A. Subsequently, in Step S103, it is checked whether or not there is any response to the transmitted connection command. When a response to the transmitted connection command is received, the process proceeds to Step S104. On the other hand, when a response command is not received, the process returns to Step S101 to check the state of the mode switchover switch 108A again. In Step S104, a control mode of the zoom lens 1A is set to the synchronization control mode.

Figure 3B:
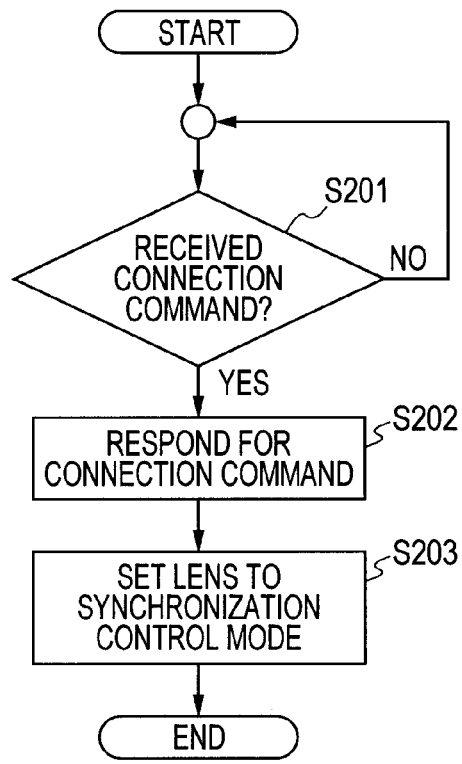
FIG. 3B is a flowchart illustrating a process for transition to the synchronization mode.

FIG. 3B is a flowchart of a process for transition to the synchronization control mode, which is performed in the zoom lens 1B. In Step S201, whether or not the connection command is received from the zoom lens 1A corresponding to the other zoom lens is checked. When the connection command is received, the process proceeds to Step S202 where the response to the connection command is transmitted. Then, the process proceeds to Step S203. In Step S203, the control mode of the zoom lens 1B is set to the synchronization control mode.

When a connection is established between the zoom lenses 1A and 1B according to the flowcharts of FIGS. 3A and 3B, the zoom lens 1A on the side of transmission of the connection command is defined as a communication master, whereas the zoom lens 1B on the side of reception of the connection command is defined as a communication slave. The communication is performed in such a way that the communication slave responds to the communication command from the communication master. The zoom lens which first operates the mode switchover switches 108A and 108B among the multiple zoom lenses to transmit the communication command in Step S102 is determined as the communication master.

In this embodiment, the zoom lens 1A is described as the communication master and the zoom lens 1B is described as the communication slave. However, the communication master and the communication slave can be interchanged. Specifically, the zoom lens 1A can also be the communication slave, and the zoom lens 1B can also be the communication master.

Flowchart of Determination of Control Master

Hereinafter, a process for determining a control master for performing the synchronization control on the zoom lenses is described. The process for determining the control master in this embodiment is performed in the zoom lens 1A in which the mode switchover switch 108A is set ON.

Figure 4:
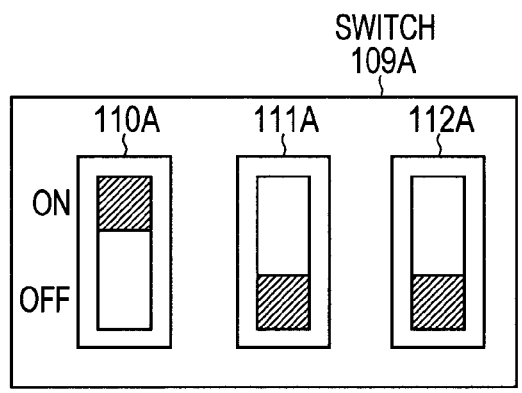
FIG. 4 is a diagram illustrating a master setting switch.

FIG. 4 illustrates the master setting switch 109A which includes a zoom master setting switch 110A, a focus master setting switch 111A and an iris master setting switch 112A.

Figure 5:
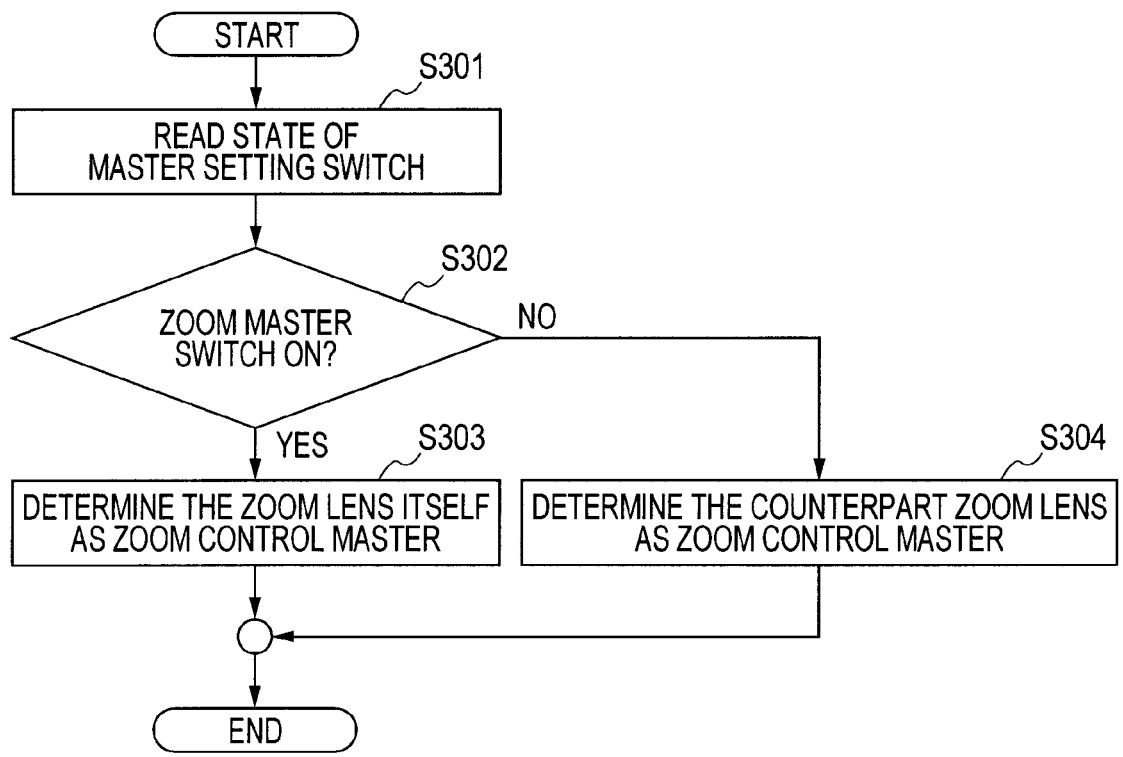
FIG. 5 is a control master determination process according to the first embodiment.

FIG. 5 is a flowchart of the determination of the control master according to the first embodiment. The process illustrated in the flowchart of FIG. 5 is performed in the zoom lens 1A after the control mode of the zoom lenses is set to the synchronization control mode by the processes illustrated in the flowcharts of FIGS. 3A and 3B. In Step S301, the state of the zoom master setting switch 110A is read. Thereafter, the process proceeds to Step S302. In Step S302, the state of the zoom master setting switch 110A corresponding to a control master determination unit is checked. When the zoom master setting switch 110A is in an ON state, the process proceeds to Step S303 where the self-lens, that is, the zoom lens 1A itself is determined as the zoom control master. When the zoom master setting switch 110A is in an OFF state, the process proceeds to Step S304 where the counterpart zoom lens, that is, the zoom lens 1B is determined as the zoom control master.

The zoom is exemplified as an example of the target to be controlled of the zoom lenses. However, even when the target to be controlled is the focus or the iris, the state of the focus master setting switch 111A or the iris master setting switch 112A, each corresponding to the control master determination unit, is read to determine the control master for each target to be controlled in the same manner as that of the determination of the zoom control master.

The control master is determined in the zoom lens 1A with the mode switchover switch 108A set ON in this embodiment. However, other methods may also be used as long as the master may be determined in any of the zoom lenses.

In the first embodiment, the case where the zoom lens 1A is set as the zoom control master and the zoom lens 1B is set as a focus control master and an iris control master is described.

Notification of Master/Slave Information

After the zoom control master and the focus control master are determined in the zoom lens 1A, information of the control masters is transmitted to the zoom lens 1B. In this embodiment, information indicating that the zoom lens 1A is the zoom control master and the zoom lens 1B is the focus control master and the iris control master is transmitted to the zoom lens 1B in the form of the communication command. After the zoom lens 1B receives the information of the control masters, the zoom lens 1B functions as a control slave for the zoom and as a control master for the focus and the iris.

Synchronization of Command Values

Hereinafter, a process for synchronizing the operations of the zoom lenses 1A and 1B with each other is described. A voltage proportional to the amount of operation is input as the speed command signal from the zoom controller 10A to the zoom lens 1A. The speed command signal is converted into the digital data in the AD converter 107A and is then transmitted to the CPU 106A also functioning as a command value determination unit.

Figure 6:
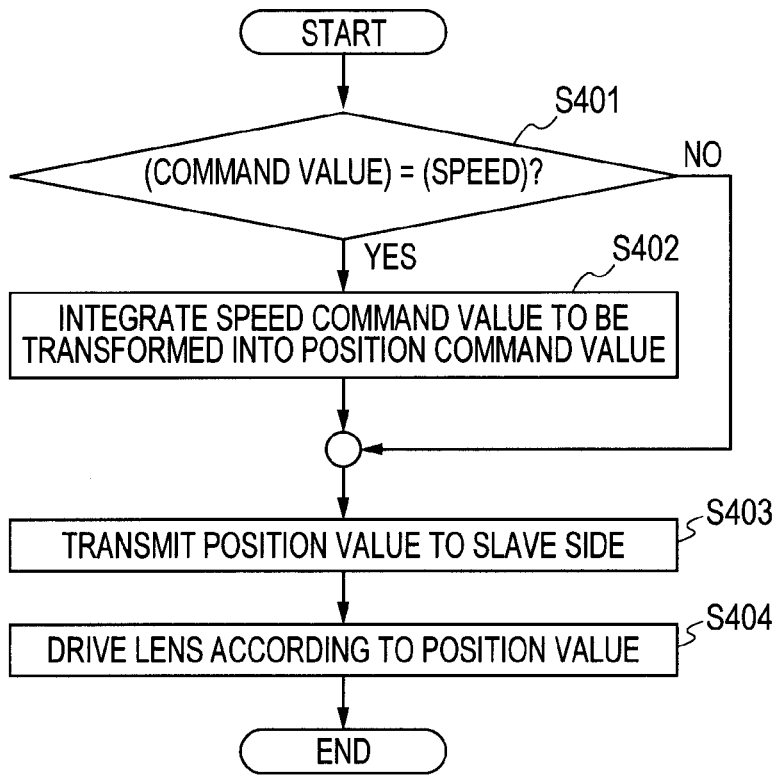
FIG. 6 is a flowchart illustrating a lens control process performed in a control master.

FIG. 6 is a flowchart of lens control on the control master side. In Step S401, whether or not the command value is the speed command value is checked. When the command value is the speed command value, the process proceeds to Step S402. On the other hand, when the command value is a position command value, the process proceeds to Step S403. In Step S402, the zoom speed command value, which is converted into the digital data, is integrated to be transformed into a zoom position command value. Then, in Step S403, the position command value is transmitted in the form of the communication command from the zoom lens on the control master side to the zoom lens on the control slave side through the connectors 20A and 20B, each corresponding to a command value transmit-receive unit. In Step S404, the lens is driven according to the position command value.

In the case of the zoom lens 1A functioning as the zoom control master, the zoom command value is input as the speed command value. Therefore, after the speed command value is transformed into the position command value, the position command value is transmitted to the zoom lens 1B. In the case of the zoom lens 1B functioning as the focus control master and the iris control master, a focus command value and an iris command value are input as the position command values. Therefore, the position command values are directly transmitted to the zoom lens 1A.

Figure 7:
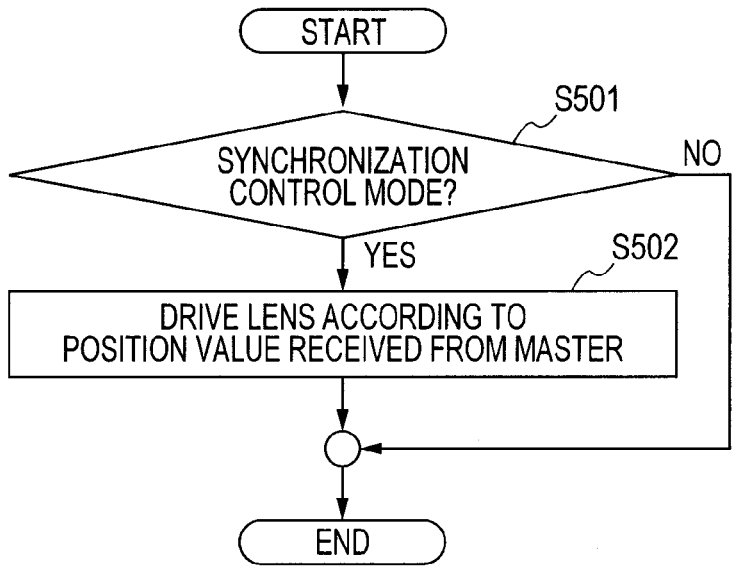
FIG. 7 is a flowchart illustrating a lens control process performed in a control slave.

FIG. 7 is a flowchart of lens control on the control slave side. In Step S501, whether or not the control mode of the lens is the synchronization control mode is checked. When the control mode is the synchronization control mode, the process proceeds to Step S502. In Step S502, the lens is driven according to the position command value received from the control master.

As described above, only the position command values are used as the command values transmitted/received between the zoom lenses through the communication. As a result, the driving of the respective zoom lenses can be controlled without causing any inconsistency.

Summary

As described above, the synchronization control for the stereoscopic image taking is enabled by the method of the first embodiment while directly using the conventional lenses and the conventional controllers, each being usable alone, without addition of a controller or a circuit dedicating stereoscopic image taking.

Moreover, the control masters can be independently determined. Thus, each of the controllers can be connected to an arbitrary one of the zoom lenses. As a result, the degree of freedom in system construction can be increased.

Second Embodiment

Determination of Master by Demand Detection Unit

As a second embodiment, a method for detecting the state of connection of the controllers to determine the control masters is described.

Similarly to the first embodiment, by the processes illustrated in the flowcharts of FIGS. 3A and 3B, the communication between the zoom lenses 1A and 1B is established. In the second embodiment, the zoom lens 1A is also described as the communication master.

Flowchart of Determination of Control Master

Hereinafter, a process for determining the zoom control master is described. A process in which the zoom lens functions as a zoom lens of the control master determination side and a process in which the zoom lens functions as a counterpart zoom lens are respectively illustrated in FIGS. 8A and 8B.

Figure 8A:
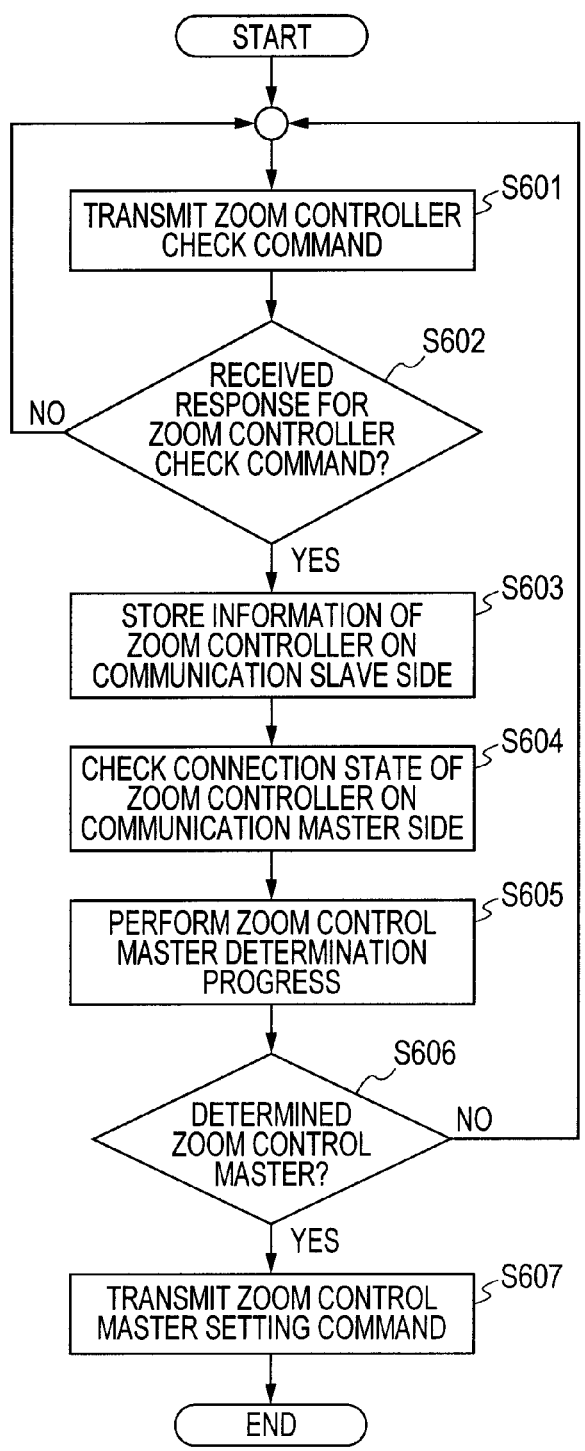
FIG. 8A is a flowchart illustrating a communication process for determination of the control master.

The flowchart of FIG. 8A is a communication process for determining the zoom control master in the CPU 106A corresponding to an operation member detector for the zoom lens on the control master determination side. In this embodiment, the process is performed in the zoom lens 1A. First, in Step S601, the zoom lens 1A transmits a zoom controller check command to the zoom lens 1B. Next, in Step 602, whether or not a response to the zoom controller check command is received is checked. When the response is received, the process proceeds to Step S603. In Step S603, zoom controller information received from the zoom lens 1B, to which the zoom lens 1A is connected, is stored in the memory included in the CPU 106A. The zoom controller information is information indicating whether the zoom controller is connected to the zoom lens 1B. In Step S604, a connection state of the zoom controller 10A in the zoom lens 1A is checked. In Step S605, the zoom control master determination process is performed based on the information from the zoom controllers in the zoom lenses 1A and 1B according to the flowchart described below.

When the zoom master is determined by the zoom control master determination process in Step S606, the process proceeds to Step S607. When the zoom master is not determined, the process returns to Step S601. Then, the zoom master determination sequence is performed again. In Step S607, the information of the zoom control master determined in Step S605 is transmitted to the zoom lens 1B.

Figure 8B:
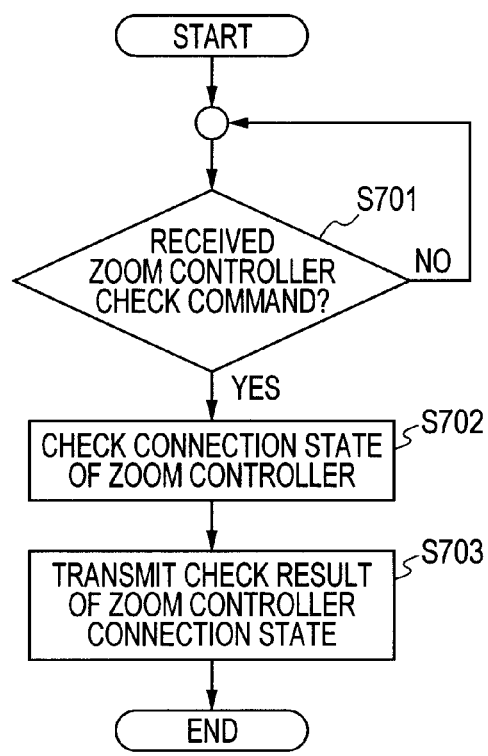
FIG. 8B is a flowchart illustrating a communication process for determination of the control master.

The flowchart of FIG. 8B illustrates a communication process for determining the zoom control master in the CPU 106B of the zoom lens which is not on the control master determination side. In this embodiment, the above-mentioned process is performed in the zoom lens 1B. In Step S701, whether or not the zoom controller check command is received from the zoom lens 1A is checked. When the zoom controller check command is received, the process proceeds to Step S702. In Step S702, a connection state of the zoom controller in the zoom lens 1B is checked. In Step S703, the results of check of the connection state of the zoom controller are transmitted to the zoom lens 1A.

Hereinafter, a process of checking the connection state of the controller is described. In this case, the connected controller is an analog type controller, to which the command value is input in the form of an analog voltage, as described in the first embodiment.

Figure 9:
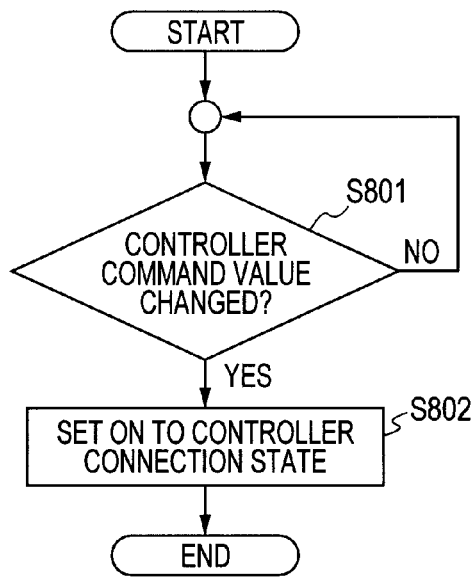
FIG. 9 is a flowchart illustrating a controller connection detection process according to a second embodiment.

FIG. 9 is a flowchart of a process of detecting the connection of the zoom controller. In Step S801, a change in the voltage (command value) input from the zoom controller 10A is checked through the input line (analog signal input unit) for the analog signal (analog command voltage) of the connector. When the voltage is changed, the process proceeds to Step S802 where the connection state of the zoom controller 10A is set to ON. In this embodiment, the connection of the zoom controller is detected based on the change in command value of the controller. However, in the case where a circuit for detecting the connection between the controllers is additionally provided, the results of detection may alternatively be used.

Figure 10:
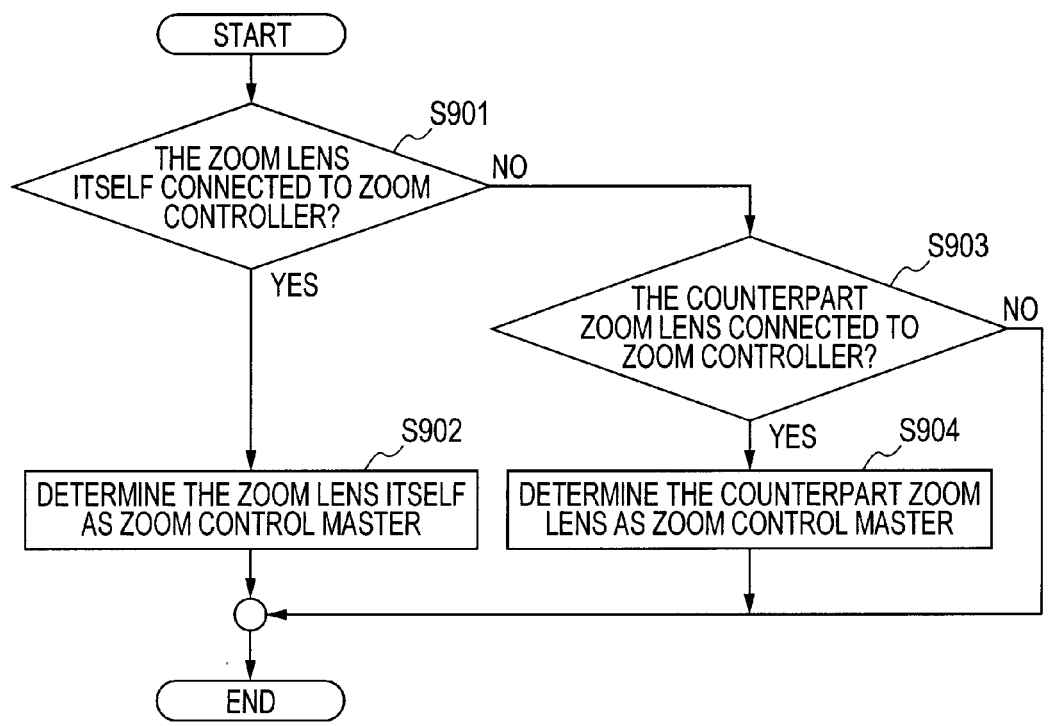
FIG. 10 is a flowchart illustrating a control master determination process according to the second embodiment.

FIG. 10 is a flowchart illustrating the zoom master determination process performed in Step S605 in detail. In Step S901, whether or not the zoom controller 10A is connected to the zoom lens 1A on the self-lens side is checked. When the zoom controller is connected to the zoom lens 1A, the process proceeds to Step S902 where the zoom lens 1A on the self-lens side is determined as the zoom control master. On the other hand, when the zoom controller 10A is not connected to the zoom lens 1A on the self-lens side, the process proceeds to Step S903 where the connection state of the zoom controller to the counterpart zoom lens is checked. When the zoom controller is connected to the counterpart zoom lens, the process proceeds to Step S904. In Step S904, the counterpart zoom lens is determined as the zoom control master.

Even in the case of the focus, a control master can be determined in the same manner as that for the zoom.

In this embodiment, the zoom controller is connected to the zoom lens 1A, whereas the focus controller is connected to the zoom lens 1B. Therefore, the zoom lens 1A functions as the zoom control master, whereas the zoom lens 1B functions as the focus control master.

Notification of Master/Slave Information, Synchronization of Command Values

Similarly to the first embodiment, after the zoom control master and the focus control master are determined in the zoom lens 1A, the information of the control masters is transmitted to the zoom lens 1B. Moreover, the command value synchronization process is performed by the processes illustrated in FIGS. 6 and 7 in the same manner as that of the first embodiment.

As described above, similarly to the first embodiment, the conventional lenses and the conventional controller, each being usable alone, are directly used to enable the synchronization control for the stereoscopic image taking. In addition, in the second embodiment, the connection of the controllers is detected to appropriately determine the control masters. Therefore, the time to set the control masters can be saved.

Third Embodiment

In Case of Digital Demands

In a third embodiment, the case where a digital type controller for transmitting the command value in the form of the communication command is connected is described.

Figures 11, 12:
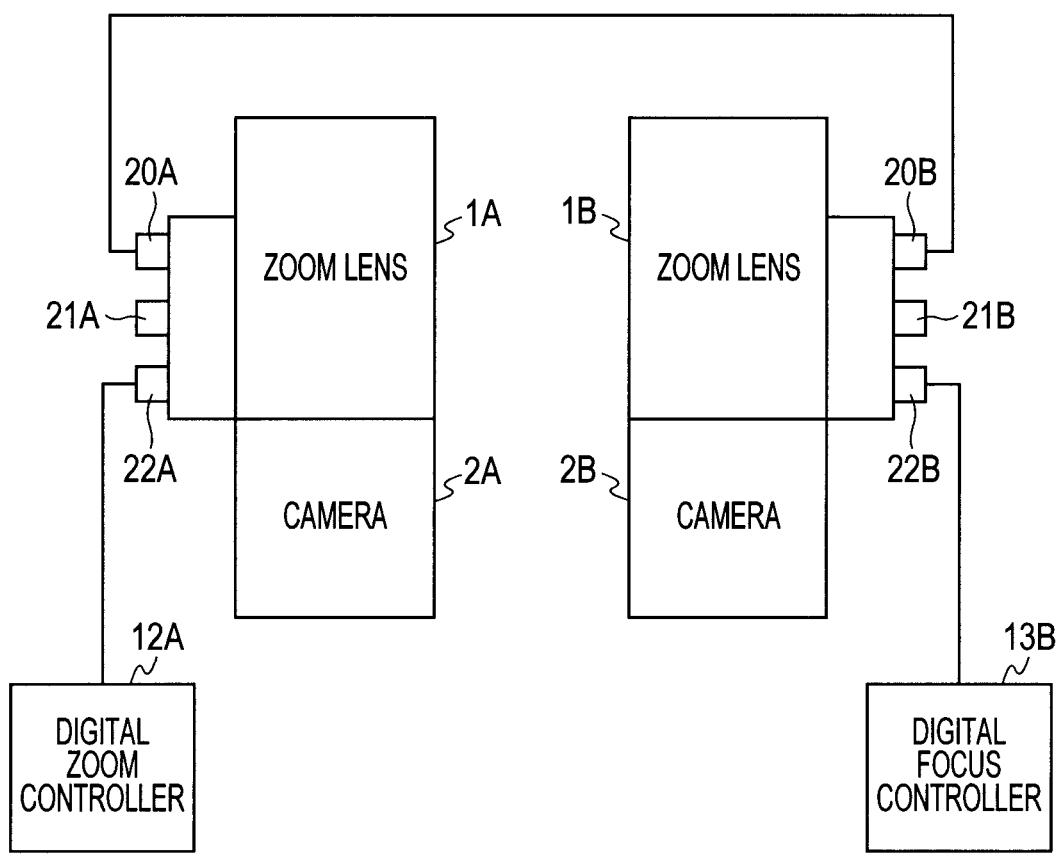
FIG. 11 is a configuration diagram (connection diagram) of a lens apparatus according to a third embodiment.
FIG. 12 is a table showing connection commands.

FIG. 11 illustrates a configuration of a lens apparatus according to the third embodiment. A digital zoom controller 12A transmits a speed command signal obtained by digitalizing a value proportional to the amount of operation of the operation member to the zoom lens 1A in the form of a communication command. A digital focus controller 13B transmits a position command signal obtained by digitalizing a value corresponding to the position at which the operation member is operated to the zoom lens 1B.

FIG. 12 is a table showing controller IDs which are transmitted when the digital type controller and the zoom lens are connected to each other. When the zoom controller is connected, a controller ID 'A' is transmitted in the form of the communication command. When the focus controller is connected, a controller ID 'B' is transmitted in the form of the communication command.

Demand Code Recognition

Figure 13:
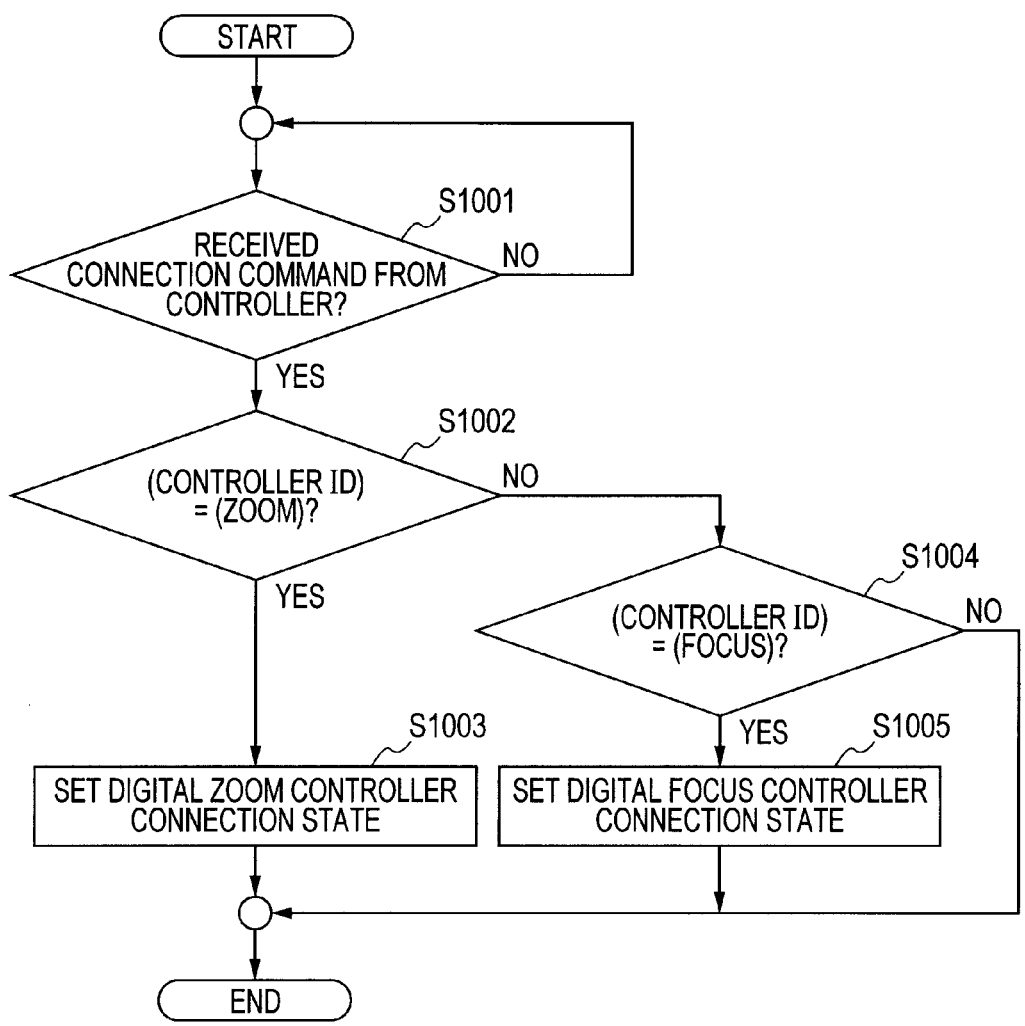
FIG. 13 is a flowchart illustrating a controller connection detection process according to the third embodiment.

Hereinafter, a process of detecting the connection of the controller according to this embodiment is described. FIG. 13 is a flowchart of a process of checking the connection of the digital type controller. First, in Step S1001, it is checked whether or not the connection command in the form of the digital signal is received from the controller 12A through the transmission/reception line (digital signal input unit) of the connector for digital data communication. When the connection command is received, the process proceeds to Step S1002. In Step S1002, the controller ID is checked. When the controller ID indicates ZOOM, the connection state of the zoom controller 12A is set ON in Step S1003. In Step S1004, whether the controller ID indicates FOCUS is checked. When the controller ID indicates the FOCUS, the connection state of the focus controller 13B is set ON in Step S1005.

Determination of Control Masters

Hereinafter, a process of determining the control masters for the synchronization control of the zoom lenses is described. The control master determination process is performed in the same manner as that of the first embodiment. In this embodiment, the digital zoom controller 12A is connected to the zoom lens 1A, whereas the digital focus controller 13B is connected to the zoom lens 1B. Therefore, the zoom lens 1A is determined as the zoom control master, whereas the zoom lens 1B is determined as the focus control master.

Notification of Master/Slave Information, Synchronization of Command Values

Similarly to the first embodiment, after the zoom control master and the focus control master are determined in the zoom lens 1A, the information of the control masters is transmitted to the zoom lens 1B. Moreover, the command value synchronization process is performed by the processes illustrated in FIGS. 6 and 7 as in the same manner as that of the first embodiment.

Even in the case where the controllers are of digital type, the same effects as those of the second embodiment can be obtained.

Fourth Embodiment

In Case Where Digital Demands and Analog Demands are Present at the Same Time

Figure 14:
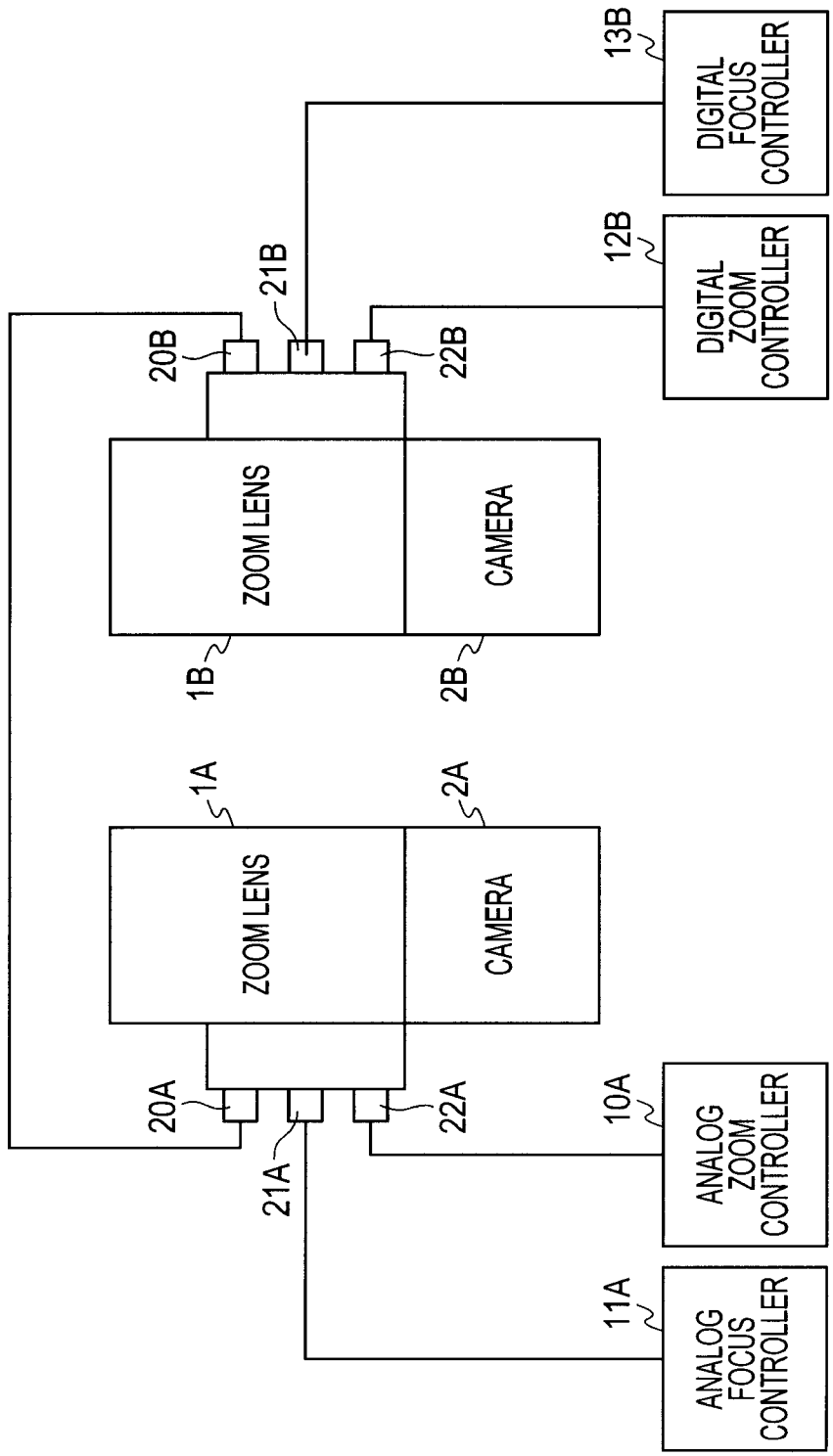
FIG. 14 is a configuration diagram (connection diagram) of a lens apparatus according to a fourth embodiment.

FIG. 14 illustrates a configuration of a lens apparatus according to a fourth embodiment. The analog zoom controller 10A and the analog focus controller 11A are connected to the zoom lens 1A, whereas the digital zoom controller 12B and the digital focus controller 13B are connected to the zoom lens 1B.

The analog type controllers are connected to the zoom lens 1A. Therefore, the connection of the controllers can be detected according to the method described in the second embodiment. On the other hand, the digital type controllers are connected to the zoom lens 1B. Therefore, the connection of the controllers can be detected according to the method described in the third embodiment.

(Flowchart of Determination of Control Masters)

Figure 15:
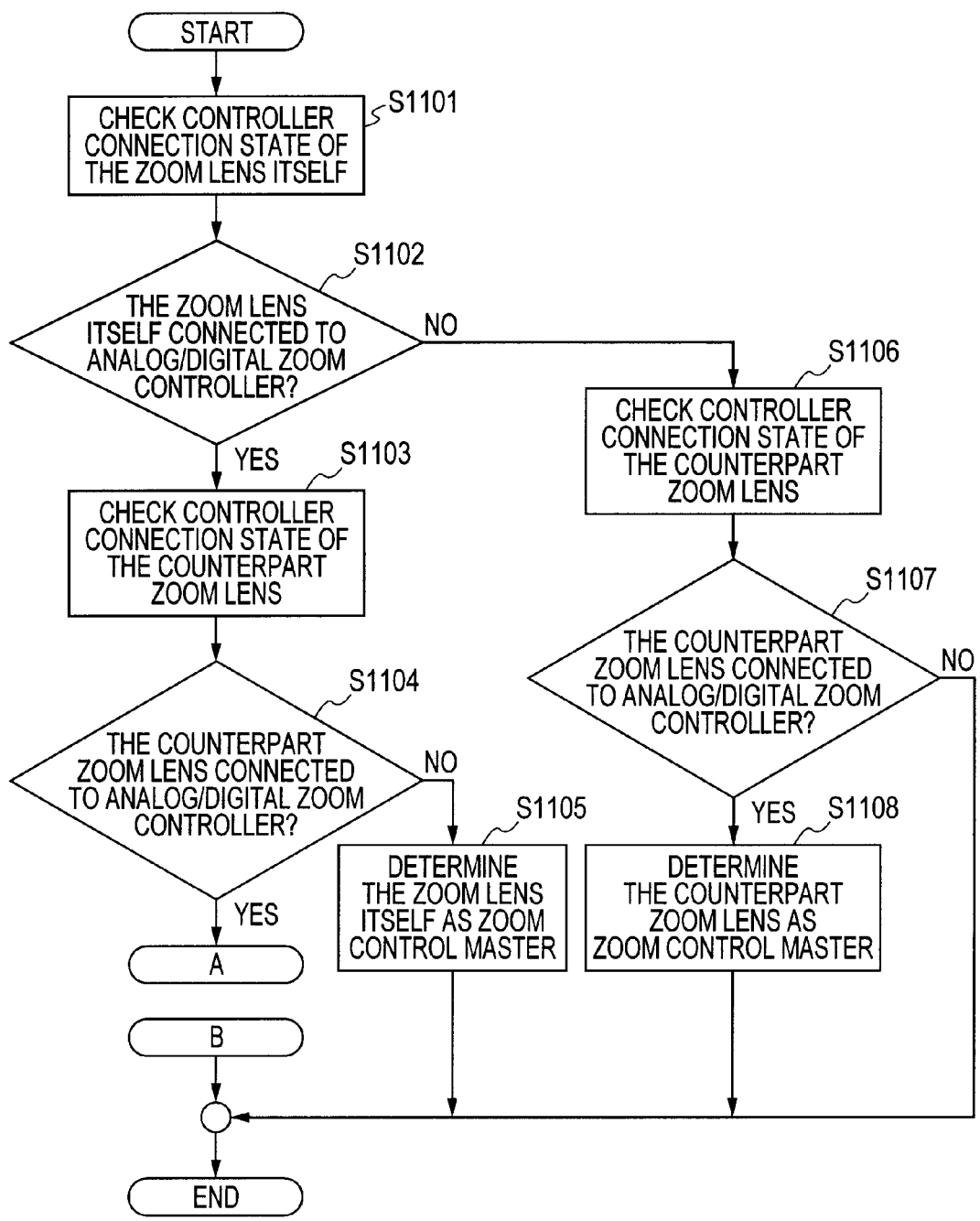
FIG. 15 is a flowchart illustrating a control master determination process according to the fourth embodiment.
Figures 16, 17:
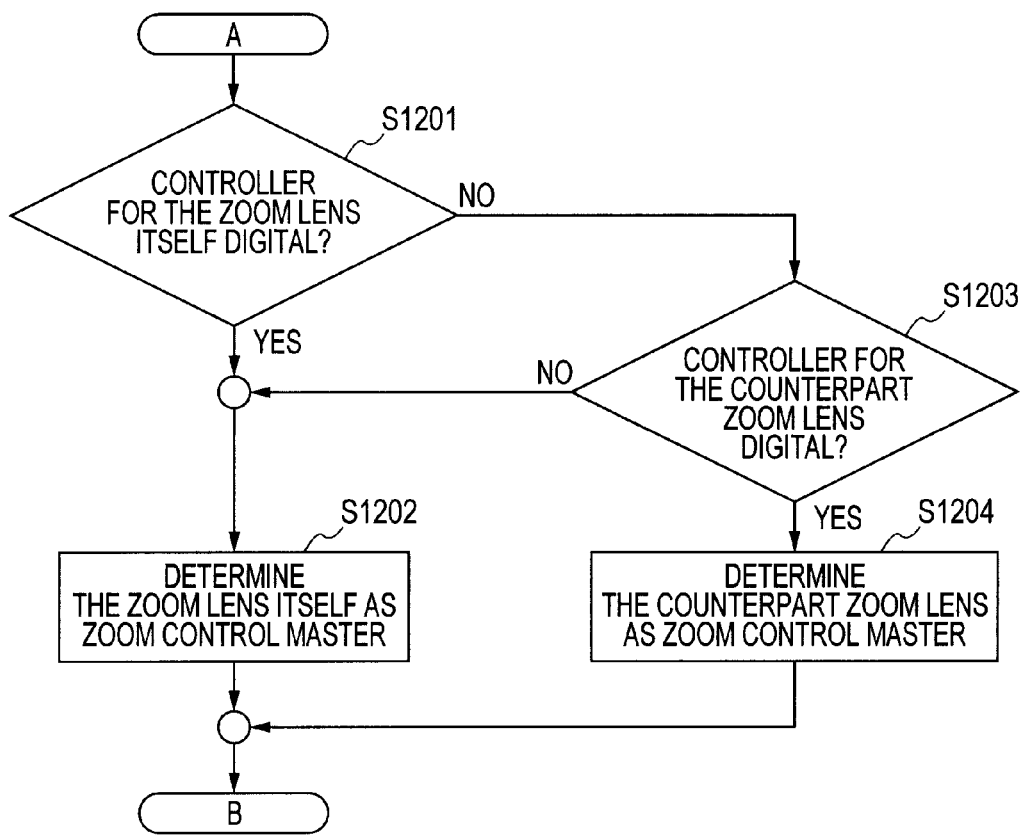
FIG. 16 is another flowchart illustrating the control master determination process according to the fourth embodiment.
FIG. 17 is a table showing a memory included in a CPU.

Hereinafter, a process of determining the control masters according to the fourth embodiment is described. FIGS. 15 and 16 are flowcharts illustrating a process of determining the zoom control master on the zoom lens 1A side. In Step S1101, whether the zoom controller is connected on the self-lens side is checked. When the analog type controller is detected according to the method of the second embodiment, analog-type controller detection information is stored in the memory included in the CPU 106A. When the digital type controller is detected according to the method of the third embodiment, on the other hand, digital-type controller detection information is stored in the memory included in the CPU 106A. FIG. 17 is an explanatory table included in the memory for storing the controller connection information, which is included in the CPU 106A. At each address, information on connections of the controllers to the self-lens side and the counterpart lens side is stored. In Step S1102, when the connection of one of the analog type controller and the digital type controller is detected based on the information stored in the memory illustrated in FIG. 17, the process proceeds to Step S1103. On the other hand, when the connection of the controller is not detected, the process proceeds to Step S1106. In Step S1103, whether the zoom controller is connected to the counterpart zoom lens side is checked. Then, the controller detection information is stored in the memory included in the CPU 106A. Next, in Step S1104, when the connection of one of the analogy type controller and the digital type controller is detected, the process proceeds to a sub-routine of FIG. 16. When the connection is not detected, the process proceeds to Step S1105 where the self-lens side is determined as the zoom control master. In Step S1106, whether the zoom controller is connected to the counterpart lens side is checked. Then, the controller detection information is stored in the memory included in the CPU 106A. When the connection of one of the analog type controller and the digital type controller is detected in Step S1107, the process proceeds to Step S1108 where the counterpart lens side is determined as the zoom control master.

FIG. 16 is a flowchart of a process of determining the zoom control master when the zoom controllers are respectively connected to both the zoom lenses. In Step S1201, whether the zoom controller connected to the self-lens side is of digital type is checked. When the connected zoom controller is of digital type, the process proceeds to Step S1202. On the other hand, when the connected zoom controller is not of digital type, the process proceeds to Step S1203. In Step S1203, whether the zoom controller connected to the counterpart lens side is of digital type is checked. When the connected zoom controller is of digital type, the process proceeds to Step S1204. On the other hand, when the connected zoom controller is not of digital type, the process proceeds to Step S1202. In Step S1202, the self-lens side is determined as the zoom control master. In Step S1204, the counterpart lens side is determined as the zoom control master. Even in the case of the focus, the focus control master is determined in the same manner as that for the determination of the zoom control master.

As described above, even when the digital type controller and the analog type controller are connected at the same time, the control masters are appropriately determined to enable the synchronization control on the two zoom lenses.

In this embodiment, the case where the digital type controller is preferentially selected when both the digital type controller and the analog type controller are connected at the same time is exemplified. However, the present invention is not limited thereto. Even by preferentially selecting the analog type controller when both the digital type controller and the analog type controller are connected at the same time, the effects of the present invention of appropriately determining the control masters to enable the synchronization control on the two zoom lenses can be obtained.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-168196 filed Jul. 27, 2010, which is hereby incorporated by reference herein in its entirety.

What is claimed is:

1. A lens apparatus to be used switchably between a first mode in which the lens apparatus is used as an independent lens apparatus, and a second mode in which the lens apparatus is used in synchronization with another lens apparatus, the lens apparatus comprising:
   a control master determination unit for determining the lens apparatus as one of a master and a slave for each target to be controlled of the lens apparatus when the lens apparatus is operated in the second mode; and
   a command value transmit-receive unit for transmitting and receiving a command value of the target to be controlled of the lens apparatus to and from the another lens apparatus when the lens apparatus is operated in the second mode,
   wherein the lens apparatus drives the target to be controlled according to a command value from a controller for the lens apparatus for the target to be controlled for which the lens apparatus is set as the master, and drives the target to be controlled according to a command value received through the command value transmit-receive unit for the target to be controlled for which the lens apparatus is set as the slave.

2. A lens apparatus according to claim 1, further comprising an operation member detector for detecting connection of an operation member for operating the lens apparatus,
   wherein the control master determination unit determines the lens apparatus functioning as the master based on results of detection of the operation member detector.

3. A lens apparatus according to claim 2, wherein the operation member detector comprises an analog signal input unit corresponding to an input unit for an analog signal, and detects the connection of the operation member for transmitting a command value in a form of the analog signal to the lens apparatus based on a change in a command signal from the operation member, the command signal being input through the analog signal input unit.

4. A lens apparatus according to claim 2, wherein the operation member detector comprises a digital signal input unit corresponding to an input unit for a digital signal, and detects the connection of the operation member for transmitting a command value in a form of the digital signal to the lens apparatus based on a communication command from the operation member, the communication command being input through the digital signal input unit.

5. A lens apparatus according to claim 2, wherein the control master determination unit determines the lens apparatus, which is connected to the operation member for transmitting the command value in the form of the digital signal, as the master when the connection of the operation member for transmitting the command value in the form of the digital signal to the lens apparatus is detected by the operation member detector.

6. A lens apparatus according to claim 1, wherein the command value transmit-receive unit transmits and receives the command value in the form of the digital signal.

7. A lens apparatus according to claim 1, further comprising a mode switchover unit for performing switching between the first mode and the second mode, wherein the mode switchover unit performs switching to the second mode when communication is established to the another lens apparatus.

8. A lens apparatus according to claim 1, further comprising a command value determination unit for determining a type of the command value to be used for synchronization control with the another lens apparatus for the target to be controlled for which the lens apparatus is set as the master when the lens apparatus is operated in the second mode, wherein the command value determination unit transforms the command signal into a position command value when the command signal from the operation member is a speed command value for the target to be controlled for which the lens apparatus is set as the master when the lens apparatus is operated in the second mode.

9. A lens apparatus according to claim 1, wherein the control master determination unit comprises a switch provided to the lens apparatus.

10. A lens apparatus according to claim 1, wherein the target to be controlled comprises a zoom, a focus and an iris.

* * * * *